| United States Patent Office | 3,277,168 |
|---|---|
| | Patented Oct. 4, 1966 |

3,277,168
ISOLATION OF ε-HYDROXYCAPROIC ACID
Karl Heinz Koenig, Ludwigshafen (Rhine), Germany, assignor to Badische Anilin- & Soda-Fabrik Aktiengesellschaft
No Drawing. Filed Nov. 23, 1964, Ser. No. 413,354
Claims priority, application Germany, Nov. 27, 1963,
B 74,421
4 Claims. (Cl. 260—535)

This invention relates to an improved process for isolating ε-hydroxycaproic acid from certain specific oxidation products obtained in the oxidation of cyclohexane with air.

In the oxidation of cyclohexane with air in liquid phase at elevated temperature and pressure, preferably in the presence of metal catalysts, there are obtained, as is well known, acids as by-products in addition to cyclohexanol and cyclohexanone, e.g. monocarboxylic acids, such as formic, acetic, propionic, butyric, valeric and caproic acids, dicarboxylic acids, such as oxalic, succinic, glutaric and adipic acids, hydroxycarboxylic acids, such as ε-hydroxy-caproic acid, aldehyde acids, ketonic acids, esters and polyesters as well as other compounds as yet unidentified. In the distillation of the reaction products, these by-products for the most part remain as residue. In the prior art processes it is preferred however to remove the by-products prior to distillation of the end products, either after or during oxidation of cyclohexane or between the various stages of oxidation, by washing with water or weakly alkaline solutions, e.g. alkali metal hydroxide solutions or alkali metal carbonate solutions. Such processes are described for example in U.S. patents specifications Nos. 2,938,924 and 3,093,686 and British patent specification No. 849,046. Since industrial cyclohexane oxidation is carried out to such an extent that considerable amounts of those wash solutions are obtained, efforts have been made to utilize the by-products contained in them. One prior art method consists in oxidizing the organic by-products contained in the wash solutions, a mixture of monocarboxylic and dicarboxylic acids being obtained.

It is also known that adipic acid, which constitutes a large part of the by-products, can be crystallized out after concentration of the wash solution. It is said to be advantageous in this method first to extract the mixture of by-products with chloroform since this promotes crystallization of adipic acid. It is further known that lactones can be separated from the oxidation by-products by a relatively complicated extraction method in which first the monocarboxylic acids are removed with a hydrocarbon and then by using a solvent for the dicarboxylic acids and lactones a solution is obtained from which adipic acid, lactones and solvent are separated by distillation or crystallization. In view of the fact that the lactones present are rather temperature-sensitive and adipic acid crystallizes out very incompletely from lactone-containing solutions, this method is not a satisfactory solution to the problem of separating the by-products.

Also, it is known that among lactones only the 5-membered ones are resistant to hydrolysis while the 6-membered ones hydrolyze fairly readily. 7-membered lactones, such as ε-caprolactone, undergo hydrolysis in a very marked degree and almost instantaneously, particularly in warm aqueous solutions, to form the corresponding ε-hydroxycarboxylic acids, which very readily form intermolecular esters (estolides or lactides) rather than intramolecular ones. Therefore only a very small amount of ε-caprolactone, which it is presumed is formed primarily in the air oxidation of cyclohexane, is present in the wash solutions as a monomeric cyclic ester (lactone); rather, nearly all of it is present in the form of monomeric and polymeric ε-hydroxycaproic acid (estolide). In this specification, therefore, the term ε-hydroxycaproic acid is used to designate the mixture of the monomeric product, the lactone and the polymeric estolides.

It is an object of this invention to provide an improved method of isolating ε-hydroxycaproic acid from the aqueous solutions obtained as washing solutions in the oxidation of cyclohexane with gases containing oxygen in molecular form. It is another object of this invention to provide a process for recovering ε-hydroxycaproic acid from solutions containing the same and obtained as wash liquids in the air oxidation of cyclohexane, which process gives a higher yield of ε-hydroxycaproic acid than processes of the prior art. It is a further object of this invention to provide a process for the recovery of ε-hydroxycaproic acid from solutions containing the same, in which the ε-hydroxycaproic acid is obtained in a purer state than is possible in prior art processes. It is a further object of this invention to provide a process for the recovery of ε-hydroxycaproic acid which is simpler than the processes known hitherto. It is yet another object to provide a new process for the economic recovery of valuable by-products of the oxidation of cyclohexane with air. These and other objects and advantages of the present invention will be evident from the following detailed description and examples.

I have found that ε-hydroxycaproic acid can be separated, in a relatively simple way and substantially completely, from aqueous or alkaline wash solutions which are obtained in air oxidation of cyclohexane at elevated temperature and pressure, if desired after separation of part of the adipic acid present, by extraction (if desired after acidification with an organic solvent), such extraction being carried out from wash solutions having a pH of 4.5 to 6.5, using as extractants water-immiscible aliphatic or cycloaliphatic alcohols, esters of saturated aliphatic monocarboxylic acids having from 2 to 8 carbon atoms and saturated aliphatic alcohols having from 1 to 8 carbon atoms, or ketones.

Examples of suitable starting materials are aqueous solutions such as are obtained in the processes described in U.S. patents specifications Nos. 2,938,924 and 3,093,686 and British patent specification No. 849,134.

For example, the solutions obtained by washing the oxidation solutions and containing about 30 to 50 wt. percent of organic compounds may be used; mother liquors obtained by concentration of the wash solutions after crystallization and separation of part of the adipic acid and containing about 35 to 75 wt. percent of organic compounds may also be employed. The composition of the organic components of these wash solutions is rather complicated and depends upon, inter alia, the pre-treatment used. In general, the wash solutions contain all products that are formed in air oxidation of cyclohexane, viz. acids, e.g. monocarboxylic acids, such as formic, acetic, propionic, butyric, valeric and caproic acids, dicarboxylic acids, such as oxalic, succinic, glutaric and adipic acids; hydroxycarboxylic acids, such as ε-hydroxycaproic acid; aldehydic acids, ketone acids, esters and polyesters as well as other compounds as yet unidentified. Particularly good results are achieved when the adipic acid proportion is not greater than 60%, preferably not greater than 35%, of the organic constituents, either from the start or after removal of part of the adipic acid.

Unless the solution has an acid reaction from the outset, it is advantageous to adjust its pH to from 4.5 to 6.5. It is particularly advantageous to carry out extraction from an aqueous solution having a pH of 4.8 to 5.8. Only by observing this pH range is it possible to ensure that the ε-hydroxycaproic acid passes into the organic phase while the alkanedicarboxylic acids remain for the most part in the aqueous phase.

Examples of suitable extractants are alkanols having from 4 to 10 carbon atoms, such as amyl alcohols, hexyl alcohols, heptyl alcohols, octyl alcohols, nonyl alcohols, decyl alcohols or cycloalkanols having from 5 to 8 carbon atoms. Specific examples are: 2-ethylhexanol, 3-methylheptanol-(2), 6-ethyloctanol-(3), 3-methylpentanol-(2), 5-ethylheptanol-(2), 3-methylpentylcarbinol, cyclohexanol, methylcyclohexanol, ethylcyclohexanol, cyclooctanol. Among esters, those of alkanecarboxylic acids having from 2 to 8 carbon atoms and alkanols having from 1 to 4 carbon atoms are preferred. Examples are: ethyl acetate, butyl acetate, ethyl propionate, butyl propionate, methyl-2-ethylhexoate. Among the ketones which are immiscible with water, dialkyl ketones having from 4 to 12 carbon atoms and cycloalkanones having from 5 to 8 carbon atoms are preferred. Examples are: methyl ethyl ketone, isobutyl ketone, pentanone-(2), heptanone-(2), 3-methylpentanone-(2), 3-methylheptanone-(2), 3-isopropylpentanone-(2), cyclohexanone, 2-propylcyclohexanone-(1), cyclooctanone. The advantage of these extractants over those used conventionally, viz chloroform or cyclohexane, consists in the fact that they have a much more favorable solubility coefficient and high selectivity, particularly for monomeric and polymeric ω-hydroxycaproic acids, which are very readily soluble in water. Thus, there are extracted not only the very small amount of ε-caprolactone contained in the wash solution but also the monomeric and polymeric ε-hydroxycaproic acids which are present in much higher concentrations.

Extraction may be carried out batchwise or continuously, either cocurrently or countercurrently. It is usually carried out at temperatures between 0 and 95° C. The conventional extraction methods may be used, e.g. mixing the wash solutions with the extractant in question by stirring, and separation by means of separators or by extraction in a column, the organic solvent being passed in a finely divided form through the wash solutions from the bottom to the top of the column. In general the extractant is used in a relative proportion of 0.5 to 20 parts, preferably 1 to 8 parts, per part of wash solution to be extracted; in batchwise operation the extractant may be used in several portions. Which relative proportions give especially good extraction results in any particular case, depends on, inter alia, the concentration of ε-hydroxycaproic acid in the aqueous wash solution and may easily be ascertained by preliminary experiments.

When the extractant is distilled off from the solution obtained there remains as residue crude ε-hydroxycaproic acid in monomeric form and/or in the form of its polyesters. It may immediately be used for further reactions, e.g. for the preparation of ε-halocaproic acid. It is also possible to separate the monomeric ω-hydroxycaproic acid from the mixture, obtained by extraction, of monomeric and polymeric ω-hydroxycaproic acids as a pure concentrated aqueous solution simply by stirring with water. The dicarboxylic acids contained in the aqueous solution, e.g. adipic acid, may be isolated in conventional manner by evaporating the solution.

*Examples 1 to 13*

1,000 g. of an aqueous solution obtained by washing the reaction product of air oxidation of cyclohexane at 90° C. with water and containing 30 wt. percent of organic substances is concentrated to about 500 g. at about 30 mm. Hg, the dicarboxylic acids precipitated (approximately 80 to 100 g.) are filtered off with suction and the filtrate, which contains about 45 to 50% of organic substances, is used for further extraction. It has a pH of 5.3. When extracting three times with 50 g. portions of extractant per 100 g. of 45 to 50% wash solution in a shaking funnel, separating the layers and distilling off the solvent, the following amounts of crude ε-hydroxycaproic acid in monomeric and/or polymeric form are obtained:

| Example | Solvent | ε-hydroxycaproic acid obtained (parts of extraction oil) |
| --- | --- | --- |
| 1 | Amyl alcohol | 44 |
| 2 | 2-ethylhexanol | 41 |
| 3 | Cyclohexanol | 43 |
| 4 | Ethyl acetate | 43 |
| 5 | Butyl acetate | 43 |
| 6 | Methylcyclohexanol | 43 |
| 7 | Methyl-2-ethylhexoate | 41 |
| 8 | Cyclohexanone | 35 |
| 9 | Ethylcyclohexanone | 38 |
| 10 | Methyl ethyl ketone | 28 |
| 11 | Methyl isobutyl ketone | 37 |
| 12 | Chloroform | 24 |
| 13 | Cyclohexane | 1.2 |

Examples 12 and 13 have been included for purposes of comparison. The above examples clearly show the superiority of the new process.

*Example 14*

1,000 parts by weight of a wash solution obtained by washing the reaction products of air oxidation of cyclohexane with water at 75 to 95° C. and having a pH of 3.8 is freed from precipitated adipic acid after partial evaporation of the aqueous solution in vacuo, and the resultant solution containing about 55 to 60 wt. percent of organic substances (about 72 wt. percent of monomeric and polymeric ε-hydroxycaproic acids, about 8 wt. percent of adipic acid) is adjusted to pH 5.5 by adding 10% caustic soda solution and continuously extracted countercurrently with cyclohexanone at 20° C. The cyclohexanone extract (280 parts by weight) contains about 80 to 85% of the total amount of monomeric and polymeric ε-hydroxycaproic acid originally present in the aqueous phase, while about 70 to 75% of the total amount of adipic acid originally present in the aqueous phase remains in the latter.

*Example 15*

1,000 parts by weight of a wash solution obtained by washing the reaction products of air oxidation of cyclohexane with about 10% caustic soda solution is partly evaporated after acidification to pH 4.8 and freed from precipitated adipic acid. The resultant solution is continuously extracted countercurrently with cyclohexanol at 30° C. (the about 45 to 50 wt. percent of organic substances contained in the aqueous solution comprises 59 to 61 wt. percent of monomeric and polymeric ε-hydroxycaproic acids and 23 to 25 wt. percent of adipic acid). On distillation of the cyclohexanol at subatmospheric pressure, 298 parts of crude monomeric and polymeric ε-hydroxycaproic acids is obtained.

I claim:

1. A process for isolating ε-hydroxycaproic acid from the aqueous solutions obtained by washing the product of the oxidation of cyclohexane with gases containing oxygen in molecular form at elevated temperature and pressure, which process comprises extracting said aqueous wash solutions having a pH of 4.5 to 6.5 with a member of the group consisting of alkanols having from 4 to 10 carbon atoms, cycloalkanols having from 5 to 8 carbon atoms, esters of alkanecarboxylic acids with 2 to 8 carbon atoms and alkanols with 1 to 8 carbon atoms, dialkyl ketones having from 4 to 12 carbon atoms and cycloalkanones having from 5 to 8 carbon atoms.

2. A process as claimed in claim 1 wherein said aqueous wash solutions are extracted after separation of part of the adipic acid present in said wash solutions.

3. A process as claimed in claim 1 wherein the aqueous wash solutions obtained by washing the product of said oxidation are alkaline and are acidified prior to said extraction.

4. A process as claimed in claim 1 wherein said aqueous wash solution being extracted has a pH of 4.8 to 5.8.

References Cited by the Examiner
FOREIGN PATENTS 935,029  8/1963  Great Britain.

LORRAINE A. WEINBERGER, *Primary Examiner.*

A. P. HALLUIN, *Assistant Examiner.*